United States Patent [19]

Thiessen et al.

[11] Patent Number: 5,232,638
[45] Date of Patent: Aug. 3, 1993

[54] APPARATUS AND METHOD FOR INTRODUCING ADDITIVES TO FIBROUS PRODUCTS

[75] Inventors: Leo K. Thiessen; Donald E. Shisler, both of Littleton, Colo.

[73] Assignee: Schuller International, Inc., Denver, Colo.

[21] Appl. No.: 947,328

[22] Filed: Sep. 18, 1992

[51] Int. Cl.⁵ .................. C03B 37/04; D04H 1/72
[52] U.S. Cl. ............................. 264/6; 65/6;
65/14; 264/8; 264/115; 264/122
[58] Field of Search ............ 264/8, 115, 122, 6;
425/8; 65/6, 8, 14, 4.4, 9

[56] References Cited

U.S. PATENT DOCUMENTS 4,359,444 11/1982 Shah et al. .................. 264/518
5,100,450 3/1992 Cunningham ..................... 65/6
5,123,949 6/1992 Thiessen ........................ 65/4.4

Primary Examiner—Mary Lynn Theisen
Attorney, Agent, or Firm—Cornelius P. Quinn

[57] ABSTRACT

A method and apparatus for expanding the fiber column produced by a rotary fiber manufacturing unit and intermingling additive particles with the fibers. A rotating bell-shaped shell is mounted beneath the rotary disc of the manufacturing unit so that the lower portion of the shell is in the path of the fiber column, causing the column to be outwardly deflected. Additive particles are introduced from within or beneath the shell and are radially directed into the fiber column. Liquid binder may be introduced to the fibers and water may be directed onto the inner surface of the shell to cool the shell to prevent curing of binder coming in contact with the shell. The fibers may be glass fibers and the particles may be foamed resin, fibers or particles of various types.

13 Claims, 4 Drawing Sheets

APPARATUS AND METHOD FOR INTRODUCING ADDITIVES TO FIBROUS PRODUCTS

FIELD OF THE INVENTION

This invention relates to the production of fibers by means of a rotary process in which molten material is extruded through fiberizing holes. More particularly, it relates to a method and means for improving the deposition of fibers to a collection surface and for introducing additive materials to the fibers.

BACKGROUND OF THE INVENTION

The rotary process for producing fibers is well known. Basically, it involves delivering a stream of molten or liquified material capable of being fiberized to a spinning rotor or disc and allowing centrifugal force to cause the material to extrude through small orifices in the disc sidewall. The resulting fibers are further attenuated and directed downwardly toward a moving collection belt or chain by a blast of air from nozzles or orifices in an air ring surrounding the fiberizing disc. The column of falling fibers is sprayed with binder which is later cured when the collected fibers are moved through an oven.

If the movement of the column of fibers is unaltered it converges at a point in its downward path to a minor diameter. The primary reason for this phenomenon is that the cylinder of high velocity air leaving the air ring orifices draws air from both inside and outside the cylinder. The inspiration of air inside the air cylinder creates a low pressure zone beneath the spinner disc, and the two pressure zones do not find equilibrium until they reach a point between the bottom of the spinner disc and the collection chain. The location of the minor diameter is affected by a number of factors, including the velocity of the air from the air ring and the static air pressure surrounding the column. The resulting well-defined relatively small column diameter permits precise deposition of fibers onto the collecting surface. On the other hand, it tends to facilitate the amassing of individual fibers into ropey bundles, resulting in many voids throughout the product due to poor fiber density distribution. Also, such a column has a high velocity which aggravates blowback around the collection chamber walls which in multi-spinner chambers can further deteriorate fiber density distribution. A glass fiber blanket product produced in this manner, for example, has less than optimal thermal insulating and tensile strength properties.

Because many of the properties of fibrous products produced by the rotary process are limited by the properties of the base fibers themselves or by the types and amounts of liquid binder that can be applied, it would at times be beneficial to modify the products in order to alter or enhance those properties. For example, it would at times be desirable to introduce additives to fibrous products for a variety of reasons. A major problem encountered in introducing additive materials, however, is the difficulty in uniformly distributing the materials throughout the fibrous matrix. If liquid additives are not sticky, they will not readily adhere to the fibers when sprayed onto the fiber column as it moves toward the collection surface. If liquid additives are sprayed onto an already formed fibrous mass, it is difficult to uniformly disperse them throughout the mass. To attempt to overcome these problems by introducing additives in solid rather than liquid form creates even more difficult problems. Solids cannot readily be introduced to a fibrous layer, nor does the present state of the art permit introducing them to the fibers as they move toward the collection surface.

It would be desirable to provide a method and means for better controlling the shape of the fiber column during production of fibers by the rotary process, while at the same time being able to introduce additive materials in such a way that they are uniformly distributed throughout the product. Further, the method of introduction should be such that it does not adversely affect the production of the base fibers or interfere with the collection and depositing of the produced fibers. In addition, the cost of introducing additives should be minor so as not to be a deterrent to the additive project. Neither should the method interfere with the introduction of liquid binder to the fibers.

SUMMARY OF THE INVENTION

The apparatus and method of the invention are applicable to the manufacture of fibers by a rotary process, wherein molten material capable of being fiberized is delivered to a disc connected to an axially extending hollow shaft for rotation therewith. The disc in such a rotary process has a sidewall containing a plurality of fiberizing openings and the apparatus includes means for impacting fibers extruded from the holes with a gaseous stream to form a column of downwardly moving fibers.

In accordance with the invention, a shell in the shape of a body of revolution is mounted beneath the disc for rotation therewith. The lower portion of the shell has a greater diameter than the upper portion and is positioned in the path of movement of the fiber column whereby the fiber column is expanded radially outwardly. Means such as a conduit extending through the hollow shaft are provided for introducing particles of additive material to the fiber column so as to substantially uniformly intermingle with the fibers.

The conduits are not limited to any one arrangement. A delivery conduit may terminate within the confines of the shell or extend through the shell to a point beneath it. More than one conduit may be provided in order to simultaneously introduce different types of additive materials. The shell may also include a bottom plate connected to the shell in such a manner as to provide openings adjacent the bottom plate through which particles of additive material may flow. In an arrangement where a conduit extends to a point beneath the shell, the bottom plate contains a centrally located opening through which the conduit extends.

In addition, liquid binder may be introduced to the fiber column and water may be directed against the inner surface of the shell to cool the shell to prevent curing of the binder on the shell surface. Liquid binder may be introduced to the fiber column in various ways. It can be introduced as a stream directed against the inner surface of the shell beneath the point at which water is introduced, as a spray directed radially outwardly toward the fiber column from a point beneath the shell, as a spray directed inwardly toward the fiber column from points outside the column, or by one or more combinations of these methods. The shell is shaped so that water in excess of the amount required to cool the shell and liquid binder which may be on the inner surface of the shell will be commingled and flow down the inner surface of the shell, forming a bead on the edge lip of the shell. The fibers moving along the exterior surface of the shell move or "wipe" through this bead of commingled resin and water and are coated with the mixture. Preferably, such a shell is in the shape of a bell.

The various types of additive materials intermingled with the manufactured fibers may vary, comprising powdered particles, fibers different from the manufactured fibers, expanded mineral particles, non-mineral particles, powdered resins, foamed resin and combinations of such materials. In any case, whatever the actual make-up of the additive material introduced, through this method the physical or performance characteristics of the ultimate fibrous product being produced can be modified or designed specifically for the desired end use.

DETAILED DESCRIPTION OF THE PREFERRED EMBODIMENTS

Figure 1:
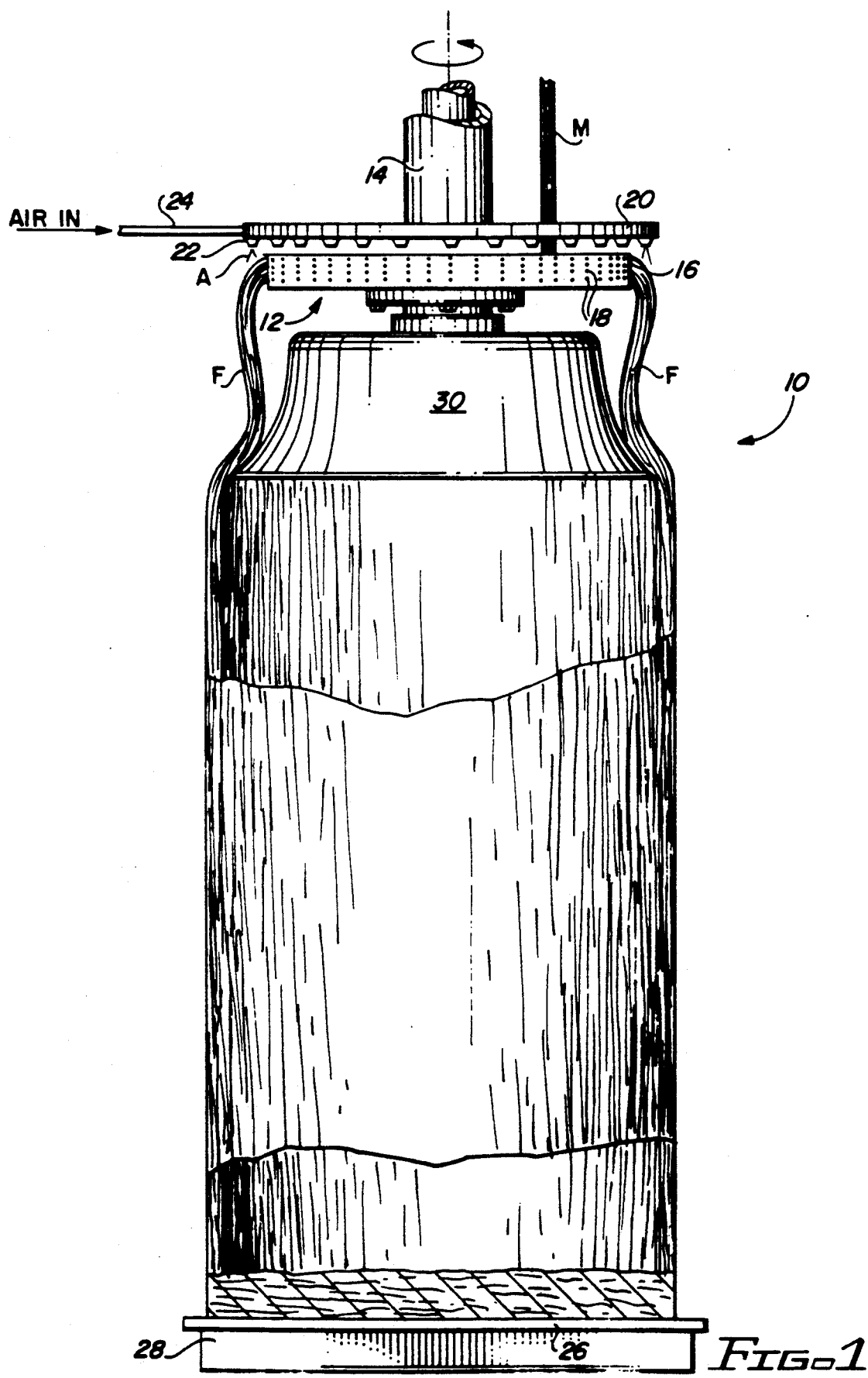
FIG. 1 is an end elevation of apparatus employed in a rotary fiber production facility which incorporates the basic features of the invention.

Referring to FIG. 1, a rotary spinner assembly 10 is comprised of a disc or spinner 12 connected to a rotating shaft 14. The disc includes a sidewall 16 which contains a myriad of small holes 18. The upper end of the disc is open to the continuous flow of molten fiberizable material M, which is moved by the centrifugal force created by the spinning disc toward the sidewall and extruded through the openings 18. Heating means, not shown, are commonly provided in close proximity to the interior of the disc for the purpose of maintaining the molten material in the desired temperature range. Mounted above and radially outwardly of the disc 12 is a hollow ring 20 containing a number of spaced orifices or nozzles 22. Air under pressure is supplied to the ring through an inlet 24 and leaves the orifices to form a cylinder of air A. Upon striking the fibers F exiting from the spinner holes 18, the air further attenuates them and directs them down toward a moving collection chain 26. A suction box 28 is shown directly beneath the chain to cause the fibers to better adhere to and collect on the chain. The structure described thus far is well known in the fiberizing art and is commonly employed in the manufacture of fiber glass.

Still referring to FIG. 1, in accordance with the invention, a shell in the shape of a truncated body of revolution 30 is mounted so as to rotate with the disc 12. The body of revolution illustrated has a minor diameter at its upper end and a major diameter at its lower end so as to have a generally downward and outward taper. The body of revolution has an increasingly greater diameter as it approaches the major diameter end to form a frusto-conical configuration, and preferably to form the illustrated bell-shaped body positioned so that the lower portion of the body intercepts fibers moving down from the disc toward the collection surface.

Figure 2:
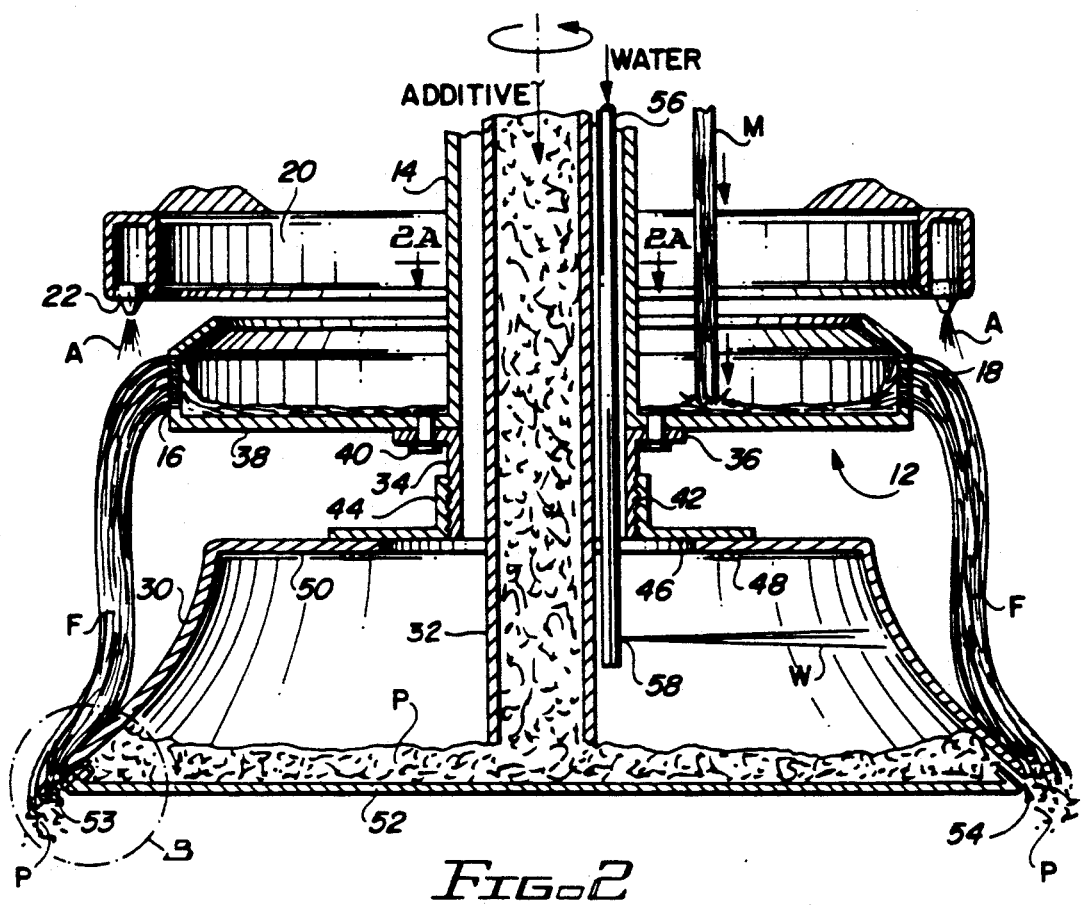
FIG. 2 is an enlarged vertical sectional view of the spinner and associated structure for altering the shape of the fiber column and introducing additives to the fiber column.
Figure 2A:
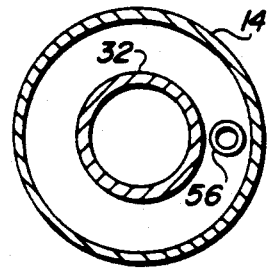
FIG. 2A is a transverse sectional view taken along line 2A—2A of FIG. 2, showing the relative locations of the water supply tube and the additive supply tube.

The arrangement described above is shown in more detail in FIGS. 2 and 2A, wherein the rotating shaft 14 is seen to be hollow, with a stationary tube 32 extending through it. A clamping hub 34 having a flange 36 at its upper end is attached to the bottom plate 38 of the disc 12 by bolts 40 which extend through the flange 36. Attached to the lower end of the hub 34 by any suitable means such as screw threads 42 is a short hub member 44 which is connected to or integral with plate 46. The bell-shaped body 30 is attached to the outer periphery of the plate 46 by circumferentially spaced bolts 48 which extend through a radially inwardly directed lip 50 of the bell. A bottom plate 52 is connected to the bottom peripheral edge portion of the bell sidewall so as to leave a small gap 54 between the sidewall and the plate. The lower end of the tube 32 is open and terminates at a point within the bell and a separate smaller diameter tube 56 through which water is supplied under pressure is provided adjacent the tube 32. The lower end of the tube 56 is closed and an orifice 58 in the tube allows a jet of water W to be sprayed against the inner surface of the rotating bell 30. If desired, the water tube 56 could instead be located within and fixed to the inside wall of the tube 32, with an orifice in tube 32 aligned with orifice 58 in tube 56.

In operation, the shaft 14 is caused to rotate at very rapid speeds, as is well known in the art, causing the attached disc 12 to rotate with it. The fibers F exiting the orifices 18 in the disc form a cylindrical sheath or column moving in a generally downward direction as shown. The column is directed radially outwardly by the interaction of the rotating bell-shaped body 30 with fiber attenuating forces, after which it continues its downward path, now at a greater dispersed diameter than it would have been if the column had not been intercepted by the bell.

At the same time, water supplied to the tube 56 under pressure is dispersed in a jet or stream through the opening 58 as indicated by the water stream W. The water strikes the inner surface of the rotating bell 30 which causes the water to form steam and cool the bell material. If the bell were not cooled, ambient binder present in the atmosphere would stick to the bell surface and gradually cause fiber to adhere to the bell. The resulting fiber clusters could possibly destroy the uniformity of fiber collection.

This operation results in a number of benefits. The fiber column conforms to the shape of the outer surface of the body 30, which causes the column to exit the body with a radial component of movement. Thus the column is radially expanded to a degree which can be controlled by varying the angle of the bottom lip of the bell surface in harmony with the attenuating force used at that time. This expansion reduces ropey fiber bundles in the column and the resulting ropey networking in the formed blanket, and provides an enlarged pattern of distribution on the collection chain, resulting in improved density distribution of the fibers. While the enlarged pattern of distribution is important at all line speeds, it becomes critical at elevated line speeds and low weight products. Further, the improved density distribution improves thermal performance yield in insulating products formed from the fiber.

Figure 3:
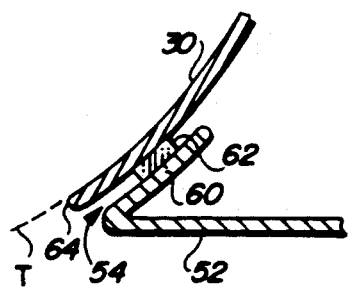
FIG. 3 is an enlarged partial sectional view showing the area within the circle 3 of FIG. 2 in greater detail.

If the bell-shaped body were not provided with the bottom plate 52, fiber and binder would tend to migrate up inside the bell, accumulating there and also possibly protruding out past the bottom lip of the bell. Because this would tend to catch and sling fibers into the column, it would interfere with the uniform coating and deposition of fibers. The bottom plate prevents fiber and binder from accumulating on the bottom rotating surface of the bell. It does not, however, prevent fiber and binder build-up on the inside edge of the bottom bell lip. To prevent this from occurring and to ensure that materials discharged into the interior of the bell are properly emitted from the rotating bell, the arrangement of FIG. 3 may be used, wherein the bottom plate 52 is rolled back to form a lip 60. The lip is spaced from the sidewall of the bell-shaped body 30 by shims 62, which are spaced about the periphery of the unit. The bottom plate 52 can be attached to the sidewall by welding the shims to both the bottom plate and the sidewall. Preferably, the bottom plate 52 is located so that the bottom surface is below the end 64 of the bell sidewall, thereby helping to shield the interior surface of the bell sidewall from fiber and binder traveling across the bottom surface of the plate.

Referring back to FIG. 2, a source of the additives to be added to the fibers is connected to the tube 32. For example, a bin or hopper of solid additive particles, not shown, may be connected to the tube through a suitable conduit, and an air assist means or mover may be included in order to move predetermined amounts of particles P through the conduit to the tube. The particles continuously exit the open end of the tube 32 to the plate 52 below it, and are thrown outwardly by centrifugal force toward the inner surface of the rotating bell 30. The particles escape the bell through the gap 54, traveling with downward and outward components of direction toward the column of fibers F. By this means the particles thoroughly intermingle with the falling fibers so that the resulting layer or mass of fibers collected on the support surface contains a uniform mixture of the fibers and additive particles.

The additive may comprise a wide variety of materials which would be desirable to include in the finished fibrous product and which are of a size and nature to permit flow through the gap 54. Readily flowable particles such as expanded perlite which are useful as extenders in fibrous insulating materials is one such example. Another material which can beneficially be introduced is foamed resin. The liquid content of resin binder introduced in this form is many times less than the liquid content of ordinary liquid resin binder, resulting in less energy required to cure the binder. Phenolic resin, for example, may comprise up to fifty times more liquid than phenolic foam. Combinations of materials, including combinations of foamed resin or a powdered resin dispersed in a water-based foam carrier with powdered resin, particulate extenders or other flowable materials may also be introduced to the fiber in this manner.

Figure 4:
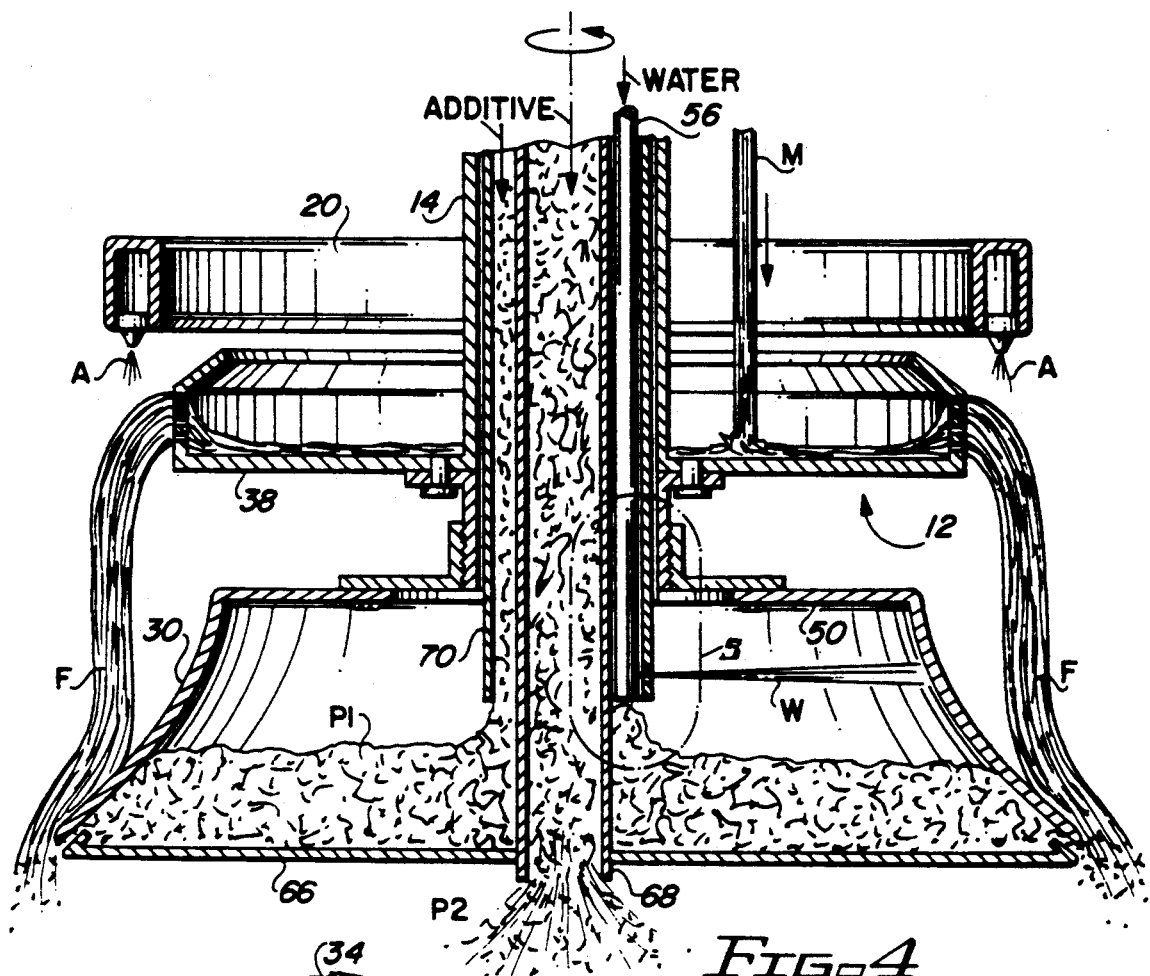
FIG. 4 is a vertical sectional view similar to that of FIG. 2, but showing a modified arrangement for introducing additives.
Figure 5:
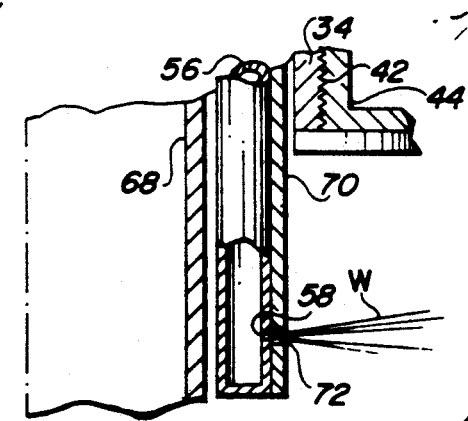
FIG. 5 is an enlarged sectional view of the structure within the oval 5 of FIG. 4.

Foamed resin may also be introduced and mixed with other materials, such as fibrous additives, which are not well suited to flow out the small gap in the rotating bell. An arrangement designed to introduce such mixtures is illustrated in FIG. 4, wherein the bottom plate 66 includes a centrally located opening through which the tube 68 extends. The tube 68, which is centrally located within a larger diameter stationary tube 70, terminates a short distance beneath the plate 66. The water tube 56 is located in the annulus between the tubes 68 and 70. As illustrated in FIG. 5, The orifice 58 in the tube 56 is aligned with an orifice 72 in the tube 70 to permit water to be directed through both orifices toward the rotating bell. The tube 70 terminates at a point within the bell between the orifices 58 and 72 and the bottom plate 66 so as not to interfere with the water jet W while allowing enough space for the introduction of material to the bell.

Figure 6A:
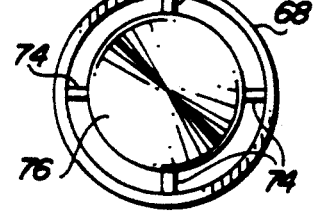
FIG. 6A is a transverse sectional view taken along line 6A—6A of FIG. 6, further illustrating the bottom portion of the modified central delivery tube.
Figure 6:
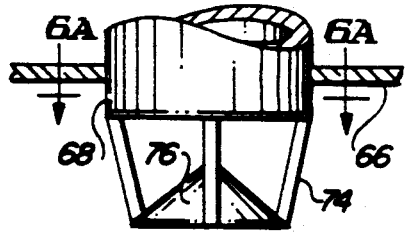
FIG. 6 is an enlarged side elevation of the bottom portion of a modified form of the central delivery tube of FIG. 4.

In operation, water is supplied through the tube 56 and orifice 58 to cool the rotating bell as explained previously. Foamed resin P1 is supplied through the annulus between the tubes 68 and 70 and flows outwardly from the tube 68. The action of the water and the foamed resin P1 is the same as described in connection with the structure of FIG. 2. In addition, additive material P2 is supplied through the central tube 68 and exits through the open end beneath the bottom plate 66. The material P2 flows generally radially outwardly from the tube 68 due to the pressure forces existing beneath the spinning bell and mixes with the resin foam P1, with both materials then mixing with the falling fibers F. If desired, the bottom end of the tube 68 may be modified by a suitable arrangement such as that shown in FIGS. 6 and 6A to initially mechanically aid the particles to flow outwardly toward the fiber column. The bottom end of the tube 68 is provided with spaced support plates or struts 74 which are connected to a centrally located cone 76. Particles of additive material P2 striking the sloped surface of the cone are thereby directed outwardly. The additive delivery means of FIG. 4 are especially useful when introducing a material which may not flow freely enough to be introduced in the interior of the bell or when two different additives which do not lend themselves to being previously blended into a single uniform batch are desired to be added to the fibers. Fibrous material, such as cellulosic fibers, is an example of material which may be better added from a point outside the bell.

Figure 7A:
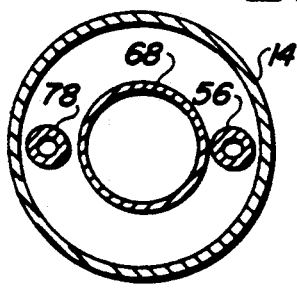
FIG. 7A is a transverse sectional view taken along line 7A—7A of FIG. 7, showing the relative locations of the water and liquid resin supply tubes and the additive supply tube.
Figure 7:
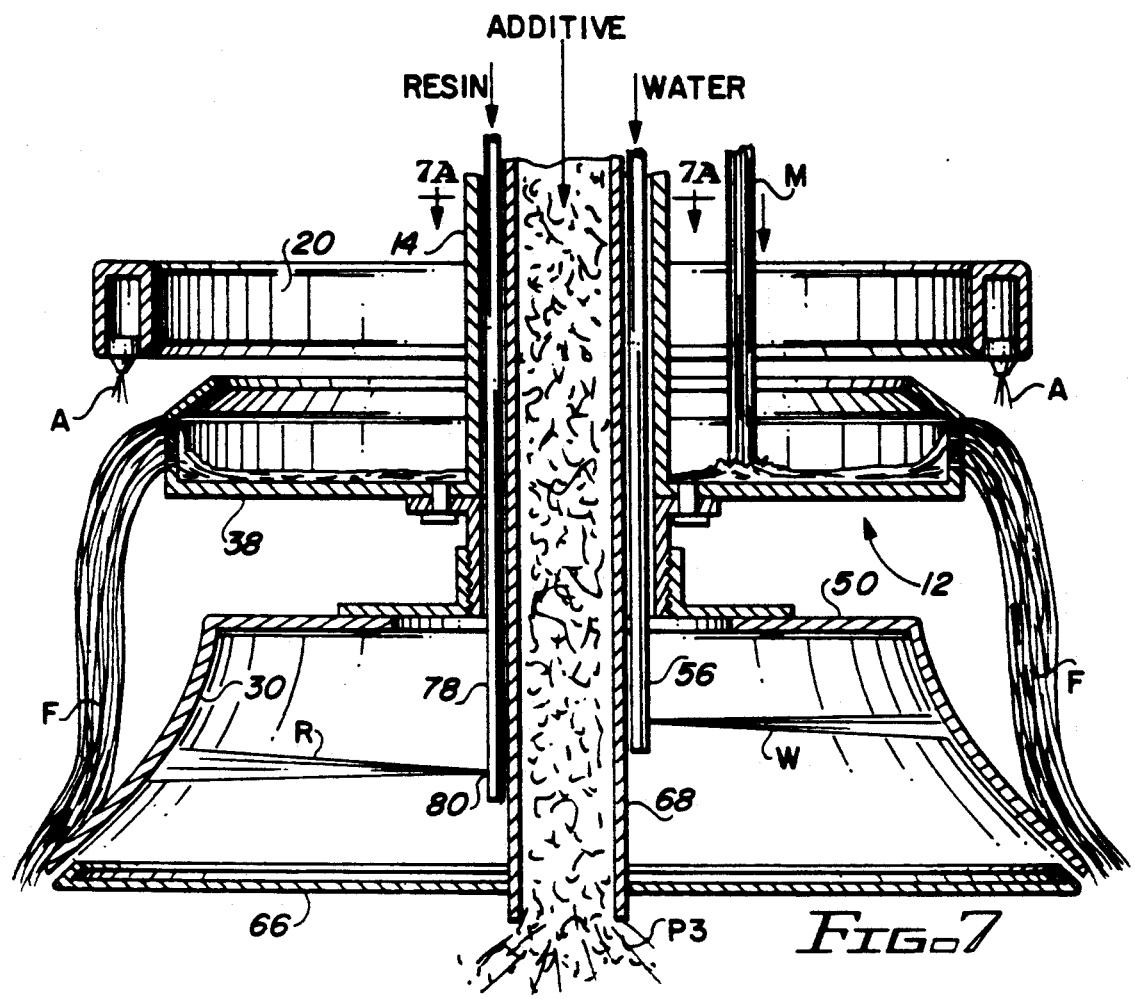
FIG. 7 is a vertical sectional view similar to that of FIG. 2, but showing another modified arrangement for introducing additives.

The additive introduction means of the invention need not preclude the addition of liquid resin. One arrangement for delivering both liquid resin and additive particles is illustrated in FIGS. 7 and 7A, which shows a particle delivery tube 68 and a water tube 56 as in FIG. 4. Instead of a larger tube surrounding the tube 68 as in FIG. 4, a small tube 78 having a closed bottom end is provided adjacent the tube 68 separated from the water tube. The tube 78 contains an orifice 80 through which liquid resin R moves in a jet toward the inner surface of the rotating bell. The liquid resin strikes the bell at a point lower than the point at which the cooling water contacts the bell. The bell contacted by the resin has thus been cooled so that the resin will not cure on it. The resin is dispensed through the gap 54 outwardly to contact and coat the fibers in the column. Additive material P3 delivered through the tube 68 is moved outwardly toward the fiber column in the manner described above where it mixes thoroughly with the fibers and resin. This arrangement is quite suitable for introducing various types of powdered materials, including powdered resin.

Figure 9:
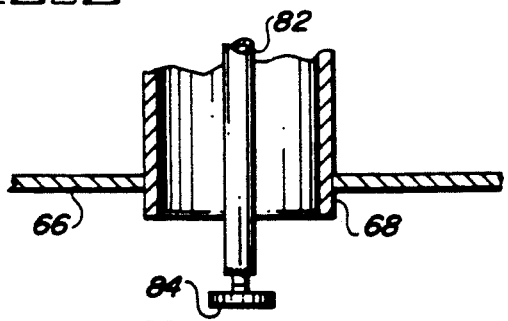
FIG. 9 is an enlarged side elevation of the structure within the circle 9 of FIG. 8.
Figure 9A:
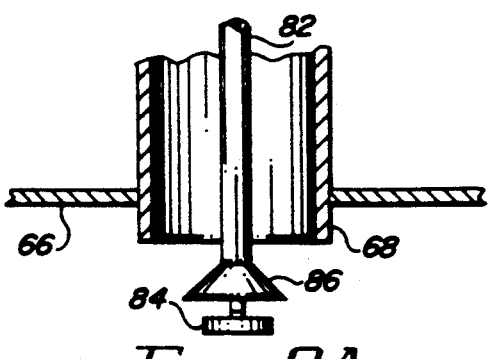
FIG. 9A is an enlarged side elevation of a modified form of the bottom structure of FIG. 9.
Figure 8A:
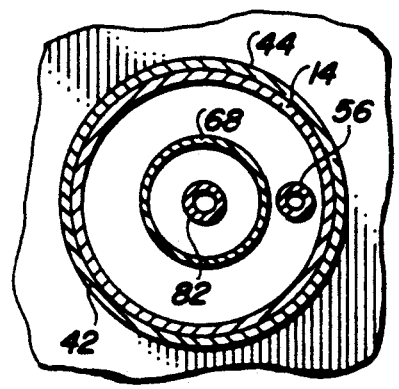
FIG. 8A is a transverse sectional view taken along line 8A—8A of FIG. 8, showing the relative locations of the water and resin supply tubes and the additive supply tube.
Figure 8:
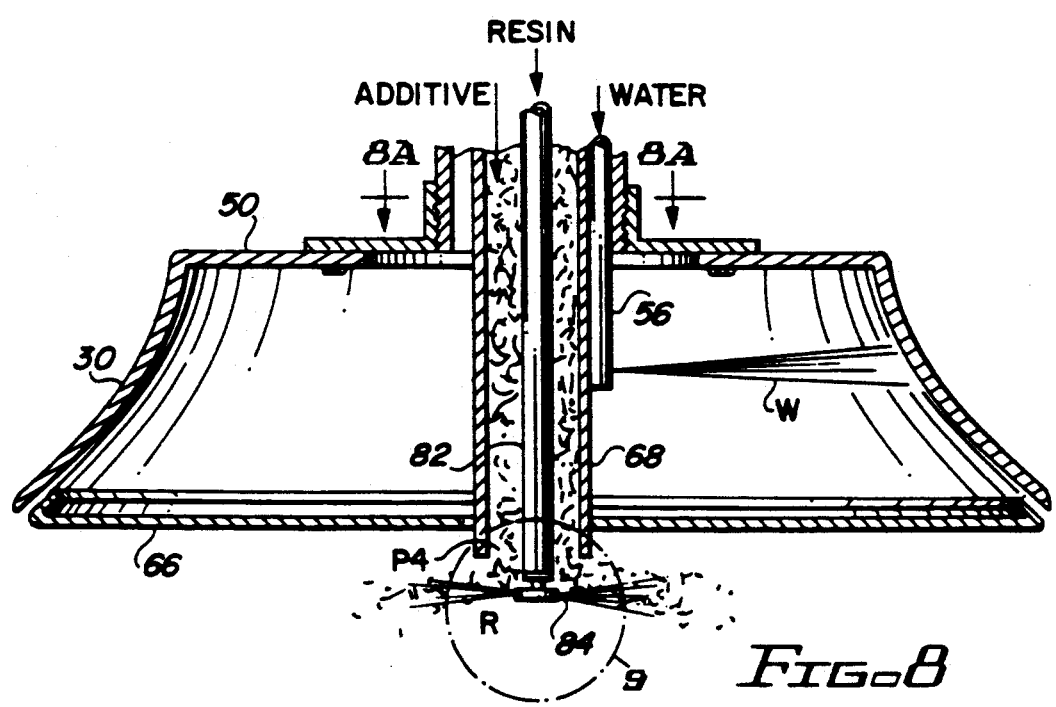
FIG. 8 is a vertical sectional view similar to that of FIG. 2, but showing a further modified arrangement for introducing additives.

As shown in FIGS. 8, 8A and 9, additive material can be introduced in conjunction with a different manner of delivering liquid binder. In this arrangement the tube 68 extends through the plate 66 and a water tube 56 is provided as in the FIG. 4 arrangement. A binder tube 82 also extends axially of the tube 68 to a point below the bottom end of the tube 68, terminating in nozzle 84. The nozzle 84 may be any of a number of commercially available nozzles capable of delivering a 360° fan of binder spray. In operation, additive material P4 is moved in the annulus between the tube 68 and the binder tube 82, exiting the tube 68 and moving outwardly in the manner of the material delivered from the central tube in the FIG. 4 arrangement. The water spray cools the bell for the reasons explained previously, and the binder and material P4 are mixed as they move toward the fibers F. The additive P4 may be given a mechanical assist in the initial outward movement in a manner similar to that of FIG. 6. As shown in FIG. 9A, a cone shaped diverter 86 may be secured to the binder tube 82 just above the nozzle 84 to outwardly divert the additive moving out the tube 68. Although not shown, it will be understood that a liquid resin tube may also be provided similar to the arrangement of FIG. 7 to provide for the delivery of liquid resin at two separate locations. This can be beneficial in ensuring the uniform coating of the fibers by resin or it could be employed to ensure the coating of both the fibers in the fiber column and particles delivered to the system from beneath the bell.

Further, in this or any of the arrangements discussed it should be understood that liquid binder can also be supplied from outside the fiber column in the conventional manner.

In connection with the application of cooling water to the bell surface, it will be understood that for any given temperature of the bell surface, the heat transferred to the cooling water is capable of causing a certain volume of the water to turn to steam. If the volume of water sprayed on the bell exceeds the amount that turns to steam, the excess water flows down the inner surface of the bell, as explained previously. The excess water contacts the fiber, cooling it and also reducing the temperature of the surrounding atmosphere, which if too hot can be detrimental to binder application. It will be understood that the amount of water added will vary depending on conditions and on the amount of water that is introduced into the process by other means, such as through inclusion in the binder mixture. Excess water beyond that required to cool the bell may be desirable in cases where such water does not interfere with the flow of additive material from within the bell, such as for cooling and conditioning fiber glass and ambient atmosphere prior to application of binder.

The sharp bell lip or edge design reduces the surface area on which fiber could build up. It also allows water and other material discharged within the bell to exit the bell tangentially through the gap 54. This provides a constant uniform flush which cleans the lip of most contamination. The width of the gap is controlled by the thickness of the shims 62, and may be altered according to the material being discharged and the operating conditions of the rotary process operation. A typical gap dimension, for example, may be about ⅛ inch.

Although the illustrated body of revolution is bell shaped, it will be understood that other shapes may work satisfactorily in some installations so long as they are able to guide the fiber column radially outwardly and can be provided with a peripheral gap or opening through which water spray can exit. A bell-shaped body is preferred, however, because the fibers are more gently diverted from their normal path by a bell shape than, for example, by a conical shape, and the column does not tend to collapse upon itself as it does when a cone-shaped body is employed.

The body of revolution is preferably formed of a sheet metal which can readily form into the desired shape, as by roll or spin forming. The cost of the body is also minimized when sheet metal, for example, 16 gage, is used. Stainless type material can be employed if desired.

If powdered or other forms of additive material are heat sensitive, the additive delivery tube may be cooled, as by a water cooled jacket.

The invention provides a unique way to both expand the diameter of the fiber column produced by a rotary fiberizing process and to permit additives of various types to be added to the fiber column in both solid and liquid form so that they are uniformly dispersed throughout the fibers.

Although various types of additives have been discussed as being suitable for addition to a fibrous product during the fiber forming operation, it will be understood that the invention is not limited to any particular type of additive material. Further, although a primary area in which the invention may be practiced is in the production of glass fibers by a rotary process, it will be appreciated that it can be practiced in conjunction with the manufacture of other types of fibers by a rotary process, such as, for example, the manufacture of organic fibers from molten organic material.

It should now be apparent that the invention need not necessarily be limited to all the specific details described in connection with the preferred embodiments, but that changes to certain features of the invention which do not alter the overall basic function and concept of the invention may be made without departing from the spirit and scope of the invention as defined in the appended claims.

What is claimed is:

1. In apparatus for manufacturing fibers by a rotary process, wherein molten material capable of being fiberized is delivered to a disc connected to an axially extending hollow shaft for rotation therewith, the disc having a sidewall containing a plurality of fiberizing openings and the apparatus including means for impacting fibers extruded from the holes with a gaseous stream to form a column of downwardly moving fibers, the improvement comprising:

a shell in the shape of a body of revolution mounted beneath the disc for rotation therewith;

the shell having an upper portion, a lower portion, an outer surface and an inner surface;

the lower portion of the shell having a greater diameter than the upper portion and being positioned in the path of movement of the fiber column whereby the fiber column is expanded radially outwardly; and a conduit extending through the hollow shaft for introducing particles of additive material to the fiber column to substantially uniformly intermingle the additive particles with the fibers of the column, said conduit terminating within the confines of the shell.

2. The improvement of claim 1, including a bottom plate and means connecting the bottom plate to the shell so as to provide openings adjacent the bottom plate and the shell through which particles of additive material may flow.

3. The improvement of claim 2, including a second conduit extending through the hollow shaft, the second conduit extending through an opening in the bottom plate and terminating beneath the bottom plate, whereby particles of additive material different from additive material introduced through the first-mentioned conduit may be introduced.

4. The improvement of claim 2, wherein the openings adjacent the connection between the bottom plate and the shell comprise spaces between the shell and the bottom plate.

5. The improvement of claim 4, wherein the spaces between the shell and the bottom plate are formed by a circumferential edge portion on the bottom plate spaced from and substantially parallel to the adjacent lower portion of the shell, the connection between the bottom plate and the shell being at spaced points along the circumferential edge portion of the plate.

6. In a process for manufacturing fibers whereby molten material capable of being fiberized is delivered to a rotating disc connected to a rotating axially extending hollow shaft, the disc having a sidewall containing a plurality of openings through which fibers are extruded, the process including the step of impacting fibers extruded from the holes with a gaseous stream to form a column of downwardly moving fibers, the improvement comprising:

providing a shell in the shape of a body of revolution beneath the disc, the shell having an upper portion, a lower portion, an outer surface and an inner surface, the lower portion of the shell having a greater diameter than the upper portion;

positioning the shell beneath the disc so that the lower portion of the shell is in the path of movement of the fiber column and rotating the shell to expand the fiber column radially outwardly; and introducing particles of additive material through the hollow shaft into the confines of the shell, the centrifugal force of the rotating shell causing the particles to be distributed radially outwardly of the shell to substantially uniformly intermingle the additive particles with the fibers in the column.

7. The improvement of claim 6, including the step of radially outwardly introducing particles of a different additive material at a point beneath the rotating shell.

8. In apparatus for manufacturing fibers by a rotary process, wherein molten material capable of being fiberized is delivered to a disc connected to an axially extending hollow shaft for rotation therewith, the disc having a sidewall containing a plurality of fiberizing openings and the apparatus including means for impacting fibers extruded from the holes with a gaseous stream to form a column of downwardly moving fibers, the improvement comprising:

a shell in the shape of a body of revolution mounted beneath the disc for rotation therewith;

the shell having an upper portion, a lower portion, an outer surface and an inner surface;

the lower portion of the shell having a greater diameter than the upper portion and being positioned in the path of movement of the fiber column whereby the fiber column is expanded radially outwardly; and a conduit extending through the hollow shaft for introducing particles of additive material to the fiber column to substantially uniformly intermingle the additive particles with the fibers of the column, said conduit terminating beneath the confines of the shell.

9. The improvement of claim 8, including means for directing water against the inner surface of the shell to cool the shell and means for introducing liquid binder to the fiber column, the means for introducing liquid binder to the fiber column comprising means for directing a stream of liquid binder against the inner surface of the shell beneath the point at which water is introduced.

10. The improvement of claim 9, wherein the means for introducing liquid binder to the fiber column comprises means for radially outwardly directing a spray of liquid binder toward the fiber column from a point beneath the shell, said means comprising a nozzle connected to a conduit extending through the hollow shaft, the nozzle being located beneath the conduit through which the particles are introduced.

11. In a process for manufacturing fibers whereby molten material capable of being fiberized is delivered to a rotating disc connected to a rotating axially extending hollow shaft, the disc having a sidewall containing a plurality of openings through which fibers are extruded, the process including the step of impacting fibers extruded from the holes with a gaseous stream to form a column of downwardly moving fibers, the improvement comprising:

providing a shell in the shape of a body of revolution beneath the disc, the shell having an upper portion, a lower portion, an outer surface and an inner surface, the lower portion of the shell having a greater diameter than the upper portion;

positioning the shell beneath the disc so that the lower portion of the shell is in the path of movement of the fiber column and rotating the shell to expand the fiber column radially outwardly; and moving particles of additive material through the hollow shaft to a point beneath the rotating shell and radially outwardly introducing the particles to the fibers in the column to substantially uniformly intermingle the additive particles with the fibers in the column.

12. The improvement of claim 11, including the steps of directing water against the inner surface of the shell to cool the shell and introducing liquid binder to the fiber column by directing a stream of liquid binder against the inner surface of the shell beneath the point at which water is introduced.

13. The improvement of claim 12, wherein the step of introducing liquid binder to the fiber column comprises radially outwardly directing a spray of liquid binder toward the fiber column from a point beneath the shell beneath the point at which additive particles are introduced.

* * * * *